United States Patent [19]

Liu

[11] Patent Number: 5,192,091

[45] Date of Patent: Mar. 9, 1993

[54] FOLDING TOY BABY CART

[76] Inventor: Kun-Hei Liu, 2F, No. 32, Lane 200, Tung Hwa Street, Taipei, Taiwan

[21] Appl. No.: 865,986

[22] Filed: Apr. 9, 1992

[51] Int. Cl.⁵ .................................................. B62B 7/08
[52] U.S. Cl. ................................ 280/644; 280/47.38; 280/650; 280/658
[58] Field of Search ............... 280/642, 644, 647, 649, 280/650, 658, 657, 47.38

[56] References Cited

U.S. PATENT DOCUMENTS

| 3,917,302 | 11/1975 | Gebhard | 280/650 |
| 4,062,555 | 12/1977 | Peng et al. | 280/650 |
| 4,108,468 | 8/1978 | Orlanski | 280/649 |
| 4,157,839 | 6/1979 | Lahti et al. | 280/650 |
| 4,457,535 | 7/1984 | Takeuchi et al. | 280/650 |

FOREIGN PATENT DOCUMENTS

| 493316 | 6/1978 | Australia | 280/650 |
| 1507446 | 12/1967 | France | 280/647 |

Primary Examiner—Eric D. Culbreth
Attorney, Agent, or Firm—Varndell Legal Group

[57] ABSTRACT

A folding toy baby cart comprising a folding frame having two handle rods, two front wheel rods, two rear wheel rods, two side rods, two center-pivoted bottom rods, two center-pivoted back rods, two end-pivoted connecting plates, two connections, two front wheel assemblies, two rear wheel assemblies, and a plurality of bolts to connecting the parts together. All of the parts of the folding frame assembly are made from an impact resistant acrylonitrile-butadiene-styrene or polypropylene. The handle rods, and the front and rear wheel tubes have each unitary U-shaped and/or L-shaped connections for connecting the corresponding parts. The front and rear wheel assemblies each include two side-matched wheels.

4 Claims, 3 Drawing Sheets

FOLDING TOY BABY CART

BACKGROUND AND SUMMARY OF THE INVENTION

The present invention relates to folding toy baby carts, and more particularly, the present invention relates to a folding toy baby cart of which the component parts are made from a plastic material for quick assembly.

Various folding toy baby carts are known. FIG. 1 illustrates the folding frame assembly of a toy baby cart according to the prior art, which is generally comprised of two handle tubes, two front wheel tubes, two rear wheel tubes, two side tubes, two center-pivoted bottom tubes, two center-pivoted back tubes, two end-pivoted connecting plates, two front wheel assemblies, two rear wheel assemblies, and a plurality of U-shaped connections and L-shaped connections to connect corresponding parts together by rivets. Because most parts of the folding frame assembly are made from metal tubes, they must be treated through bending, punching and electroplating processes. Therefore, the manufacturing process of the folding toy baby cart is complicated, causing its cost to be expensive. Because the U-shaped connections and the L-shaped connections are separately provided and connected in place by rivets, this structure of folding frame does not meet the requirements for Do-It-Yourself. Tubes, U-shaped and L-shaped connections made from metal can easily hurt children's hands. Further, attaching the wheels to the front and rear wheel tubes is also not easy.

The present invention has been accomplished to eliminate the aforesaid disadvantages. It is therefore an object of the present invention to provide a folding toy baby cart which is easy and inexpensive to manufacture. It is another object of the present invention to provide a folding toy baby cart which is made from impact resistant plastic material. It is still another object of the present invention to provide a folding toy baby cart which can be conveniently assembled by the consumers.

DETAILED DESCRIPTION OF THE PREFERRED EMBODIMENT

Figure 1:
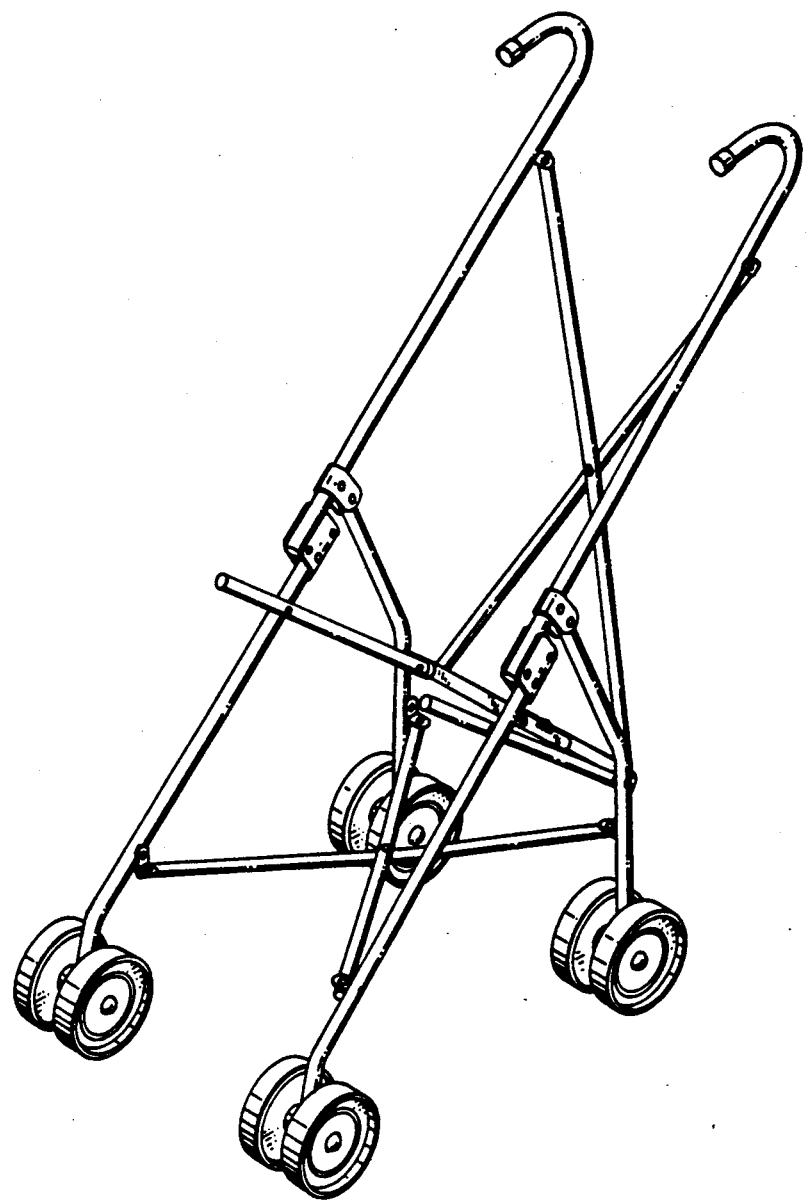
FIGS. 1 is an elevational view of the frame assembly of a prior art folding toy baby cart.
Figure 2:
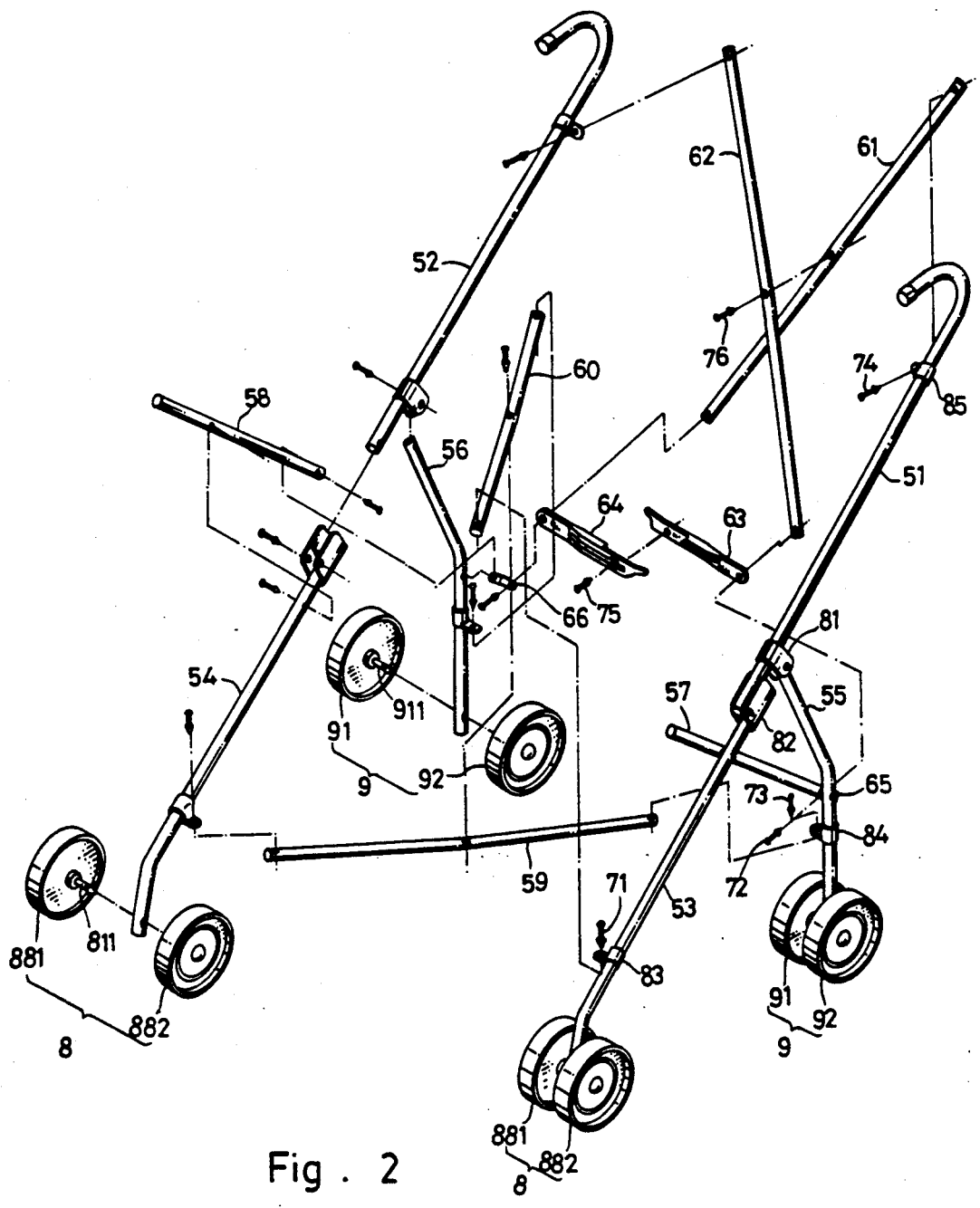
FIG. 2 is an exploded view of the frame assembly of a baby toy cart embodying the present invention.
Figure 3:
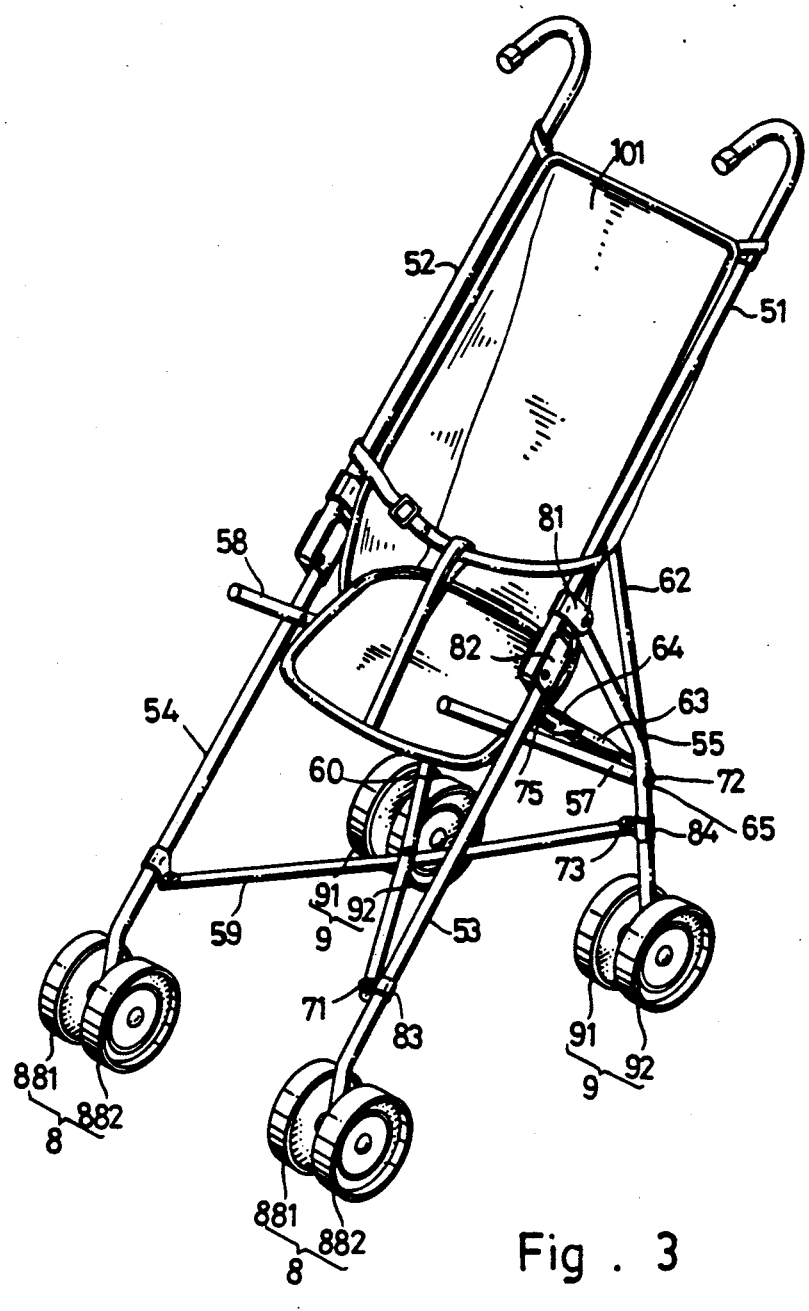
FIG. 3 is an elevational view of the toy baby cart of the present invention.

Referring to FIGS. 2 and 3, a toy baby cart in accordance with the present invention is generally comprised of a canvass 101 stretched on a folding frame assembly. The folding frame assembly of the toy baby cart is generally comprised of a pair of handle rods 51, 52, a pair of front wheel rods 53, 54 respectively connected to the handle rods 51, 52 to hold two front wheel assemblies 8, a pair of rear wheel rods 55, 56 respectively connected to the handle rods 51, 52 to hold two rear wheel assemblies 9, a pair of side rods 57, 58 to connect the front wheel rods 53, 54 to the rear wheel rods 55, 56, two bottom rods 59, 60 pivoted at the center and crossedly connected between the front wheel rods 53, 54 and the rear wheel rods 55, 56, two back rods 61, 62 pivoted at the center and crossedly connected between the handle rods 51, 52 and the rear wheel rods 55, 56, two connecting plates 63, 64 with one end thereof foldably connected to each other and an opposite end thereof respectively connected to the back rods 61, 62, two connections 65, 66 with one end thereof respectively connected to the connecting plates 63, 64 and the back rods 61, 62 and an opposite ends thereof respectivley connected to the side rods 57, 58, and a plurality of fastening bolts, 71, 72, 73, 74, 75, 76, in securing the aforesaid parts in place. The aforesaid parts, in except of the canvass 101, are all made from impact resistant acrylonitarile-butadiene-styrene (ABS) or polypropylene (PP) through the process of injection molding. The front wheel rods 53, 54 have each a unitary U-shaped connection 82 at one end for connecting either handle rod 51 or 52, and a unitary L-shaped connection 83 at an opposite end for connecting either bottom rod 59 or 60. The handle rods 51, 52 have each a unitary U-shaped connection 81 at one end for connection either rear wheel rod 55 or 56, and a unitary L-shaped connection 85 at an opposite end for connecting either back rod 61 or 62. The rear wheel rods 55, 56 have each a unitary L-shaped connection 84 for connecting either bottom rod 59 or 60. Because all the parts are made from ABS or PP resin, the manufacturing cost of the toy baby cart is greatly reduced. Because the U-shaped connections 81, 82 and the L-shaped connections 83, 84, 85 are directly formed on the handle rods 51, 52, the front wheel rods 53, 54 or the rear wheel rods 55, 56 during their production, the parts can be more easily efficiently assembled into a frame assembly.

As shown in FIG. 2, the fastening bolts used in the present invention, such as those identified by 71, 72, 73, 74, 75 and 76, have the shape of a cylindrical rod or pin with heads of a larger diameter than the cylindrical rod or pin at each end thereof. One of the heads of the fastening bolts has a cone shape with the pointed end of the cone facing outward from the fastening bolt.

The L-shaped connections 83, 84 and 85 surround the respective rods 53, 55 and 51 to which they are fastened and have an extended tab with a hole therein for receiving a corresponding fastening bolt.

Referring to FIG. 2 again, the front wheel assemblies 8 and the rear wheel assemblies 9 are each consisted of two wheels 881, 882 or 91, 92. By inserting the center bolt 811 or 911 of one wheel 881 or 91 through a respective hole (not indicated) on either wheel rod 53 or 54; 55 or 56, and into an axle hole (not shown) on the respective other wheel 882 or 92, the wheel assemblies 8, 9 can be respectively secured to the wheel rods 53, 54, 55, 56.

I claim:

1. A folding toy baby cart which comprises of a canvass stretched on a folding frame assembly, said folding frame assembly comprised of a pair of handle rods, a pair of front wheel rods respectively having a top connected by a first U-shaped connection and a first fastening bolt to said handle rods and a bottom holding a front wheel assembly, a pair of rear wheel rods respectively having a top connected to said handle rods by a second U-shaped connection and a second fastening bolt and a bottom holding a rear wheel assembly, a pair of side rods respectively connecting said front wheel rods and said rear wheel rods by third fastening bolts, two bottom rods pivoted together at respective centers thereof by a fourth fastening bolt and crossedly connecting between said front wheel rods and said rear wheel rods by first L-shaped connections and fifth fastening bolts, two back rods pivoted together at respective centers thereof by a sixth fastening bolt and crossedly connecting said handle rods by second L-shaped connections and seventh fastening bolts and said rear wheel rods by eighth fastening bolts, two connecting plates with one end thereof foldably connected to each other by a ninth fastening bolt and an opposite end thereof respectively connected to said back rods by a tenth fastening bolt, two connections with one end thereof respectively connected to said connecting plates and said back rods by eleventh fastening bolts and an opposite end thereof respectively connected to said side rods by twelfth fastening bolts, wherein said handle rods; said front wheel rods; said rear wheel rods; said side rods; said bottom rods; said back rods; said connecting plates; said two connections; said first and second U-shaped connections; said first and second L-shaped connections; said first, second, third, fourth, fifth, sixth, seventh, eight, ninth, tenth, eleventh and twelfth fastening bolts are made of impact resistant plastic material;

said first, second, third, fourth, fifth, sixth, seventh, eight, ninth, tenth and eleventh and twelfth fastening bolts having a shape of a cylindrical rod with heads at each end thereof with a larger diameter than said cylindrical rod, one of said heads having a cone shape with a pointed end thereof facing outward relative to said cylindrical rod, and said first U-shaped connections are respectively integrally formed with said front wheel rod, said second U-shaped connections are respectively integrally formed with said handle rod, said first L-shaped connections are respectively integrally formed with said front wheel rods and said rear wheel rods, said first L-shaped connections respectively surround said front wheel rods and said front wheel rods and have an extended tab with a hole for receiving said fifth fastening bolts, and said second L-shaped connections are respectively integrally formed with said handle rods, said second L-shaped connections respectively surround said handle rods and have an extended tab with a hole for receiving said seventh fastening bolts.

2. The folding toy baby cart of claim 1, wherein said impact resistant material is impact resistant acrylonitrile-butadiene-styrene.

3. The folding toy baby cart of claim 1, wherein said impact resistant material is impact resistant polypropylene.

4. The folding toy baby cart of claim 1, wherein said front and rear wheel assemblies each have a first wheel matched to a second wheel, said first wheel having a center bolt passing through a hole on a respective front or rear wheel rod and inserted into an axle hole in said second wheel.

* * * * *